US005305791A

United States Patent [19]

Kowalchuk

[11] Patent Number: 5,305,791

[45] Date of Patent: Apr. 26, 1994

[54] REMOTE FLUID FLOW CONTROLLER

[76] Inventor: Allan M. Kowalchuk, 16 Upland Drive, Regina, Saskatchewan, Canada, S4R 0B9

[21] Appl. No.: 20,598

[22] Filed: Feb. 22, 1993

[51] Int. Cl.$^5$ .............................................. F16K 31/05

[52] U.S. Cl. .............................. 137/613; 251/129.04; 137/554

[58] Field of Search .................. 137/613, 614.19, 554, 137/551; 251/129.04, 129.02

[56] References Cited

U.S. PATENT DOCUMENTS

| | | | |
|---|---|---|---|
| 4,146,049 | 3/1979 | Kruse et al. | 137/551 X |
| 4,180,008 | 12/1979 | Mallett | 137/87 |
| 4,779,839 | 10/1988 | Sears | 251/129.04 X |
| 4,790,514 | 12/1988 | Marks | 251/129.04 X |
| 5,003,943 | 4/1991 | Lafferty, Sr. | 251/58 X |

FOREIGN PATENT DOCUMENTS 599430 7/1960 Canada .

*Primary Examiner*—Martin P. Schwadron
*Assistant Examiner*—Kevin L. Lee

[57] ABSTRACT

The present invention provides a fluid controlling apparatus that has a remote signal transmitter that sends a signal to a signal receiver that has power supplied to it by a power supply. The signal receiver now generates a new signal to a valve controller which controls a solenoid operated valve that controls fluid flow from an inlet to an outlet. A first embodiment controls fluid flow which shuts down a power take off commonly driven by an internal combustion engine while a second embodiment controls fluid flow to shut down by movement of an intake air blocker valve, an internal combustion engine. Both embodiments include an indicator including a standby indicating light and an operational indicating light. The valve controller in the first embodiment includes a main solenoid with a fluid flow operated grounding switch for permitting operation of the solenoid operated valve that controls the fluid flow from the inlet to the outlet.

12 Claims, 2 Drawing Sheets

REMOTE FLUID FLOW CONTROLLER

This application relates to fluid flow control by remote means and in particular to controlling the power take off or engine of a vehicle used to deliver volatile fuel.

BACKGROUND OF THE INVENTION

With the advent of the automobile came the requirement for a liquid petroleum fuel. This fuel soon became a requirement for many types of engines used in many forms of machines. Tractors to work the fields and combines to harvest the crop became increasingly popular and to be more competitive people and the environment began to take a beating. The fuel which is now being delivered to the machine operators at or near the workplace brought about a whole new set of circumstances. The drivers of the vehicles delivering the fuel are generally under a lot of pressure especially in spring and fall when time is of the esesnce. These resulting pressure situations make it easy for a bad judgement call to result in an accident. It is to prevent such accidents that applicant has directed the thrust of the instant invention.

Two such attempts known by applicant to avoid the above mentioned accident problem are found in U.S. Pat. No. 5,003,943-Apr. 2, 1991 and Canadian patent No. 599,430-Jun. 7, 1960.

Patent "943" is directed mainly to a device for shutting off the air intake passage of engines. It does, however, disclose a control system to operate the air shut off and fuel shut down thereby stopping the engine. The air is stored in a reservoir and released upon recceipt of a signal. There is a shuttle valve to send an air signal to the governor control for fuel shut down and a shuttle valve to send an air signal to a 4-way valve to operate cylinders which force the baffle plate in the engine intake to cut off operational air supply. Applicants device while performing a similar function is directed mainly to controlling the flow of the pressurized fluid by a remotely initiated electrical signal that controls solenoid operated valve means.

Patent "430" is designed to prevemt excess pressure build up in the pumping system of a delivery vehicle when dispensing fuel oil, gasoline or the like. This excess pressure can cause a great deal of damage to the system. There is a by-pass valve for holding the pressure at an acceptable level. However, under excess rotational speeds the capacity of this by-pass valve can be exceeded with disastrous results. To obviate this problem there is provided a pressure operated engine cut off switch with means to prevent fire in the event of failure of the pressure element. In contrast applicant provides a remote device to control the pressurized fluid that is used to shut down a power take off or to shut off the engine of a vehicle delivering fuel when an emergency situation arises.

BRIEF SUMMARY OF INVENTION

The present invention provides a fluid controlling apparatus comprising in combination, a remote signal transmitting means, a signal receiving means adapted to receive a signal from said signal transmitting means, a fluid inlet means, a fluid outlet means, a power supply means for supplying power to said controlling apparatus including said signal receiving means, solenoid operated valve means, valve control means for controlling said solenoid operated valve means, said valve control means including a signal generated by said signal receiving means upon receipt of said signal from said signal transmitting means, thereby controlling the fluid flow by remote control from said fluid inlet means to said fluid outlet means. The above fluid controlling apparatus encompasses a first embodiment that controls pressurized fluid flow which shuts down a power take off commonly driven by an internal combustion engine, while a second embodiment controls pressurized fluid flow to shut down by movement of an intake air blocker valve an internal combustion engine. Both embodiments include an indicator means including a standby indicating light and an operational indicating light. The valve control means in the first embodiment is more sophisticated than the second embodiment partly in that it further includes a main solenoid with a pressurized fluid operated grounding switch and the valve means are a solenoid operated shut off valve and a solenoid operated safety valve in series with said inlet means, and said outlet means.

It is readily discernible from the above summary that it is a prime object of the present invention to provide a means to protect lives and the environment.

It is a further object of the above invention to provide a means to prevent fires and contamination of nearby water supplies.

It is a further object of this invention to provide a device that is effective and easy to operate.

It is yet another object of this invention to provide a device that effectively controls pressurized fluid flow remotely from the flow.

It is yet another object of this invention to provide a device that is easy to manufacture, easy to adapt to the existing equipment and relatively inexpensive.

These and other objects of the present invention will become readily apparent as the following description is read in conjunction with the accompanying drawings wherein like reference numerals indicate like elements throughout the several views.

DETAILED DESCRIPTION OF THE DRAWINGS

Figure 1:
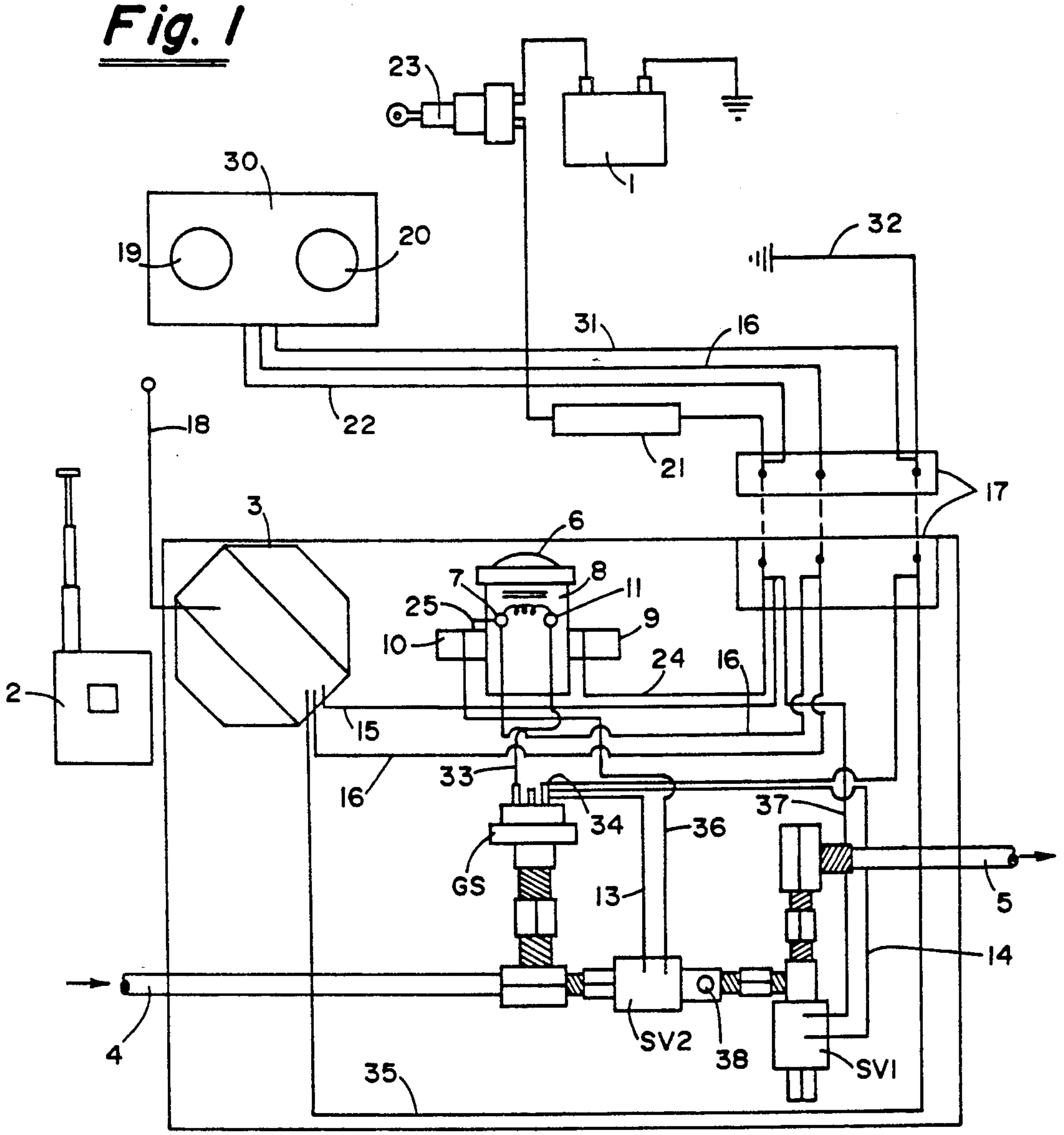
FIG. 1 is a schematic diagram of the first embodiment of the present invention indicating how the apparatus controls the flow of the pressurized fluid to operate or shut down a power take off of an internal combustion engine transmission to carry out the prime object of this invention.

Referring to FIG. 1 we have a grounded electrical supply means including a battery 1 which is normally found in most vehicles today. Controlling the electrical current or power flowing from this battery 1 is a power on/off switch 23 which is normally the ignition switch. The current or power after passing through the power on/off switch 23 passes through a power supply fuse 21 and into a junction block 17. The junction block 17 is separable for convenience and will be joined when operational. The junction block 17 connects power coming from the power supply fuse 21 to the indicator means 30 by means of standby light power supply 22 which powers the standby indicating light 19. Included in the indicator means 30 is an operational indicating light 20 which is powered by the remote control receiver output 16. Both the standby indicating light 19 and the operational indicating light 20 are grounded, or use the same indicator ground return circuit 31 which is joined in the junction block 17 to the common ground return 32. The stand by indicating light 19 when lighted indicates that power is received at the junction block 17 and should be available to the remainder of the controller. The operational indicating light 20 when lighted indicates that the remote control receiver 3 has generated a signal which is the remote control receiver output 16.

In this particular embodiment we have a remote control signal transmitting means 2 which when activated generates a signal that is received by a remote control signal receiving means 3 which includes a receiving antenna 18. The remote control signal receiving means 3 is powered by remote control receiver power supply 15 with a receiver ground return circuit 35 which goes to the common ground return 32 in the junction block 17. The remote control signal receiving means 3 generates a remote control receiver output 16 which powers the operational indicating light 20 and in parallel supplies power to a main solenoid means 6 by being connected thereto at the main solenoid activate post 7. From the main solenoid activate post 7 there is a jumper means 25 carrying current or power to the main solenoid outlet post 10 from here the current or power is carried by the solenoid operated shut off valve power supply 36 to operate the solenoid of the solenoid operated shut off valve SV2. The solenoid operated shut off valve SV2 has a ground return circuit 13 carrying current or power to a common contact ground return circuit post 34 and from there to the common ground return 32 at junction block 17. The remote control receiver output 16 lasts only for about 30 seconds, therefor the jumper 25 was required for continuous closure of the solenoid operated shut off valve SV2 which is normally biased open to permit passage of the controlling fluid. To ensure continuous current or power flow, current or power is provided through the main solenoid power supply 24 to the main solenoid inlet post 9. The current or power supplied by the remote control receiver output 16 to the main solenoid activate post also activates a main solenoid pull in coil 8 which permits the flow of current or power from the main solenoid inlet post 9 to the main solenoid outlet post 10 and on as before to the solenoid operated shut off valve SV2 to prevent fluid flow from fluid inlet 4 to fluid outlet 5. When the current or power from the remote control receiver output 16 ceases after 30 seconds the current or power flowing from main solenoid inlet post 9 to main solenoid outlet post 10 passes through the jumper means 25 and keeps the main solenoid pull in coil activated for a continuous flow of current or power through solenoid operated shut off valve power supply 36 to solenoid operated shut off valve SV2. For the main solenoid pull in coil 8 to operate it must be grounded by the current or power passing through the main solenoid ground return circuit 33 through the fluid operated grounding switch GS through the common contact ground return circuit post 34 to the common ground return 32. It is the initial opening of an existing pressurized fluid flow switch by an operator in the cab of a vehicle having a power take off to operate a pump to pump liquid that closes the connection in the fluid operated grounding switch between the main solenoid ground return circuit 33 and the common contact ground return circuit post 34. When the solenoid operated shut off valve SV2 is closed fluid no longer passes out fluid outlet 5 while the fluid in the circuit is vented at vent 38 thereby causing the power take off to cease functioning. The only way to restart the power take off is for the operator to return to the vehicle cab and shut off the existing pressurized fluid flow switch. There is now no longer fluid flow to fluid inlet 4 and no fluid pressure to operate the fluid operated grounding switch GS and the solenoid operated shut off valve SV2 is now biased open. To reactivate the system the existing pressurized fluid flow switch is now opened, fluid passes into fluid inlet 4, closes the fluid operated grounding switch GS, passes through the biased open solenoid operated shut off valve SV2, then through a solenoid operated safety valve SV1, through fluid outlet 5 to operate the power take off which operates the liquid pump which pumps a liquid such as gasoline or diesel fuel to be dispensed to a customer. The solenoid operated safety valve SV1 just mentioned is normally biased closed but when powered by the power on-off switch 23 through solenoid operated safety valve power supply 37 it is opened allowing a fluid to flow out fluid outlet 5. The solenoid operated safety valve SV1 has been placed in series with the solenoid operated shut off valve to prevent power take off operation in the event of a short circuit or power supply failure such as a blown fuse 21.

To operate the system an operator opens an existing pressurized fluid flow switch in the cab of a vehicle when a liquid is to be dispensed by a liquid pump operated by a power take off driven by the transmission of the vehicle. The fluid then enters fluid inlet 4, it closes the fluid operating grounding switch GS, passes through an open solenoid operated shut off valve SV2, through solenoid operated safety valve SV1, out fluid outlet 5 to control an existing power take off which powers a liquid pump to pump liquid such as gasoline. When a fire or other problem occurs with the dispensing of the gasoline, the operator, removed from the vehicle up to 100 meters, presses the remote control signal transmitter 2 which sends a signal to the remote control signal receiver 3 which through a signal to a main solenoid 6 controls the solenoid operated shut off valve SV2 thereby preventing further pumping of the gasoline and minimizing any disastrous results.

Figure 2:
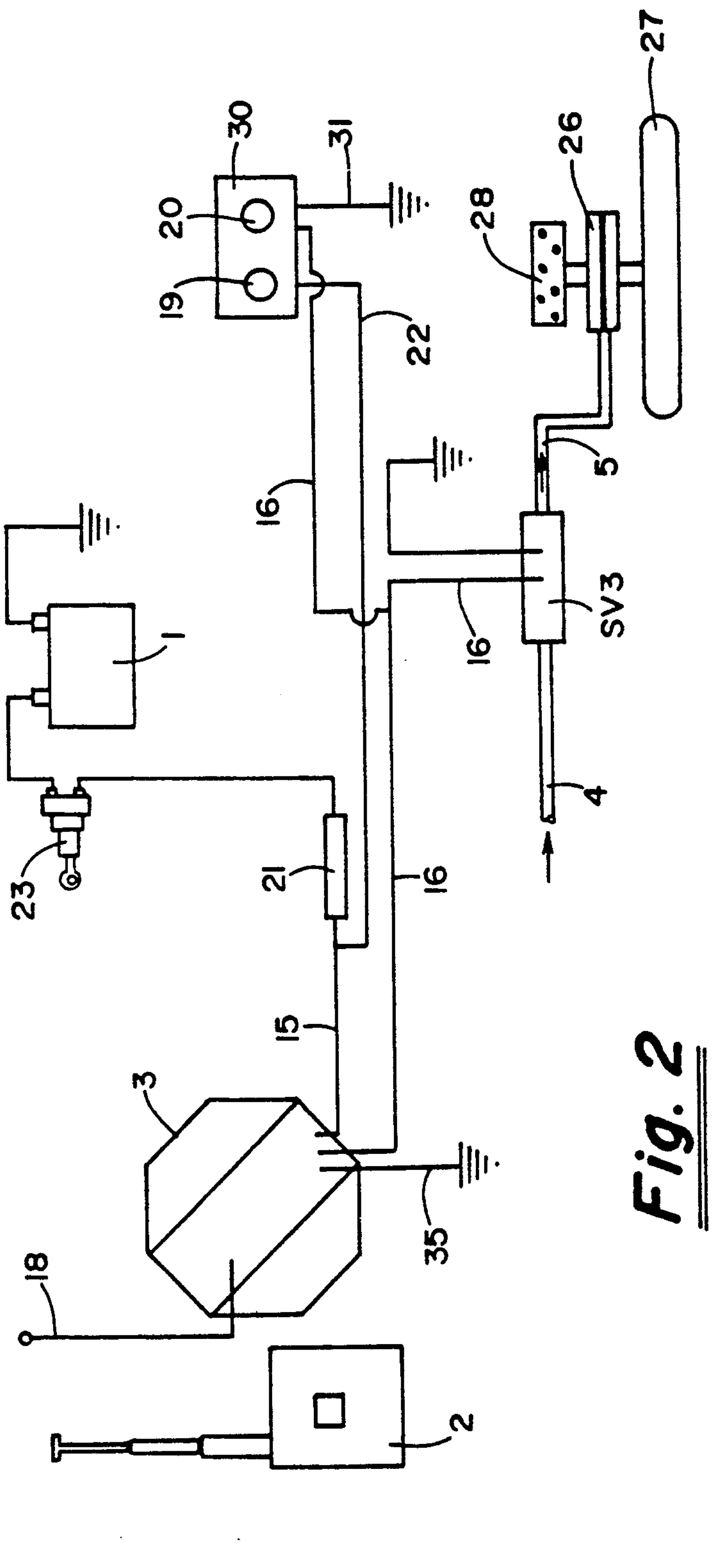
FIG. 2 is a schematic diagram of the second embodiment of the present invention indicating how the apparatus controls the flow of the pressurized fluid to operate an air blocker valve to shut off the intake air thereby shutting down an internal combustion engine to carry out the prime object of this invention.

Now referring to FIG. 2 we again have a power supply means including a grounded battery 1 feeding power or current to a power on-off switch 23 and through a fuse 21 to a remote control signal receiver 3 with an antenna 18 by means of remote control receiver power supply 15. For activation a remote control signal transmitter 2 sends a signal to remote control signal receiver 3 which generates a signal as a remote control signal receiver output 16. The remote control signal receiver 3 has a receiver ground return circuit 35. The remote control receiver output 16 powers a solenoid operated power valve SV3 which is normally biased closed preventing fluid flow from fluid inlet 4 to fluid outlet 5. Pressurized fluid under the control of an existing fluid flow switch in the vehicle is provided. Fluid outlet 5 is connected to an air blocker valve 26 which can prevent engine combustion air passing through an engine air cleaner to enter an engine intake manifold thereby making the engine inoperative. The solenoid operated power valve SV3 when operated by power from the remote control receiver output 16 opens up allowing fluid to pass through fluid inlet 4, through the solenoid operated power valve SV3, through fluid outlet 5 moving the air blocker valve 26 to the closed position shutting down or making the engine inoperative.

Also provided in this embodiment is the indicator means 30 with an indicator ground return circuit 31. Supplying current or power to the indicator means is a standby light power supply 22 to indicate that power is coming from the power supply means. Also supplying power or current to the indicator means 30 is the remote control receiver output 16 which powers the operational indicating light 20 to show that the solenoid operated power valve SV3 has been activated and that no more liquid such as gasoline can be pumped.

In this particular case the engine shut down causes failure of the transmission to power the power take off pump which ceases to pump the gasoline or other dangerous liquid.

To restart the engine a manual release lever (not shown) removing the air blocker valve 26 from its air blocking position is required. The manual release lever is normally positioned under the engine hood.

Various modifications such as size, shape and arrangement of components may be made without departing from the spirit and scope of the invention. The above disclosure shall be interpreted as illustrative only and limited only by the scope of the invention as defined in the following claims.

What is claimed is:

1. In a fluid flow controlling apparatus for controlling the flow of pressurized fluid comprising in combination, a remote signal transmitting means, a signal receiving means adapted to receive a signal from said signal transmitting means, a fluid inlet means, a solenoid operated shut off valve and a fluid outlet means all in series, control means for controlling the operation of said solenoid operated shut off valve upon receipt of a signal generated from said signal receiving means upon receipt of said signal from said signal transmitting means, power supply means, said control means including a main solenoid means activated by said generated signal to transfer power from said power supply means to said solenoid operated shut off valve thereby preventing fluid from flowing from said fluid inlet means to said fluid outlet means and wherein said main solenoid means includes a power supply inlet post for receiving power from said power supply means, a power supply outlet post for transferring power to said shut off valve solenoid, a main solenoid activate post for receiving said generated signal and a main solenoid ground return circuit post and further including a jumper means between said main solenoid activate post and said power supply outlet post for ensuring continued power to said shut off valve solenoid upon cessation of said generated signal.

2. A fluid flow controlling apparatus for controlling flow of pressurized fluid comprising in combination, a solenoid operated safety valve biased in the closed position when unactivated, a solenoid operated shut off valve biased in the open position when unactivated, an inlet for said pressurized fluid, an outlet for said pressurized fluid, said solenoid operated shut off valve and said solenoid operated safety valve being in series between said inlet and said outlet, control means for controlling said solenoid operated shut off valve, transmitter means, receiver means for receiving a signal from said transmitter means to activate said control means to control said solenoid operated shut off valve, power supply means, said solenoid operated safety valve being controlled by activating said power supply means, switch means operated by said fluid pressure presence for making effective said solenoid operated shut off valve control means, whereby said pressurized fluid entering said fluid flow controlling apparatus operates said switch means, passes through said biased open solenoid operated shut off valve and said power supply means being connected to said solenoid operated safety valve opens said biased closed solenoid operated safety valve to let the pressurized fluid exit.

3. A pressurized fluid flow controlling apparatus comprising in combination, a grounded electrical power supply means, including ground return circuits, remote signal transmitting means, signal receiving means powered by said power supply means and adapted to be actuated by a signal transmitted from said remote signal transmitting means, valve means, valve control means for controlling a first portion of said valve means and powered by said grounded electrical power supply means, said valve control means including a control signal generated by said signal receiving means, whereby fluid entering said fluid flow controlling apparatus is controlled at will by actuating said remote signal transmitting means and wherein said ground return circuits include a switch connected to said valve control means and operated by said fluid pressure entering said apparatus to connect a portion of said ground return circuits to said grounded electrical power supply means to permit controlled operation of said first portion of said valve means.

4. A pressurized fluid flow controlling apparatus as claimed in claim 3 wherein a second portion of said valve means includes a fluid flow safety valve operated by a first solenoid, said fluid flow safety valve when not operated by said first solenoid is biased in a closed position whereby a failure of said electrical power supply means will result in a fluid flow stoppage.

5. A pressurized fluid flow controlling apparatus as claimed in claim 4 wherein said first portion of said valve means includes in series with said fluid flow safety valve a fluid flow shut off valve operated by a second solenoid, said fluid flow shut off valve when not operated by said second solenoid is biased in an open position.

6. A pressurized fluid flow controlling apparatus as claimed in claim 5 wherein said valve control means further includes a main solenoid which is activated by said control signal generated by said signal receiving means to control said second solenoid operated fluid flow shut off valve.

7. A pressurized fluid flow controlling apparatus as claimed in claim 6 wherein said main solenoid includes externally thereof a main solenoid activate post, a main solenoid first main post, a main solenoid second main post, a jumper between said main solenoid activate post and said main solenoid second main post, a main solenoid ground return circuit post and internally thereof, a main solenoid pull in coil connected to said main solenoid activate post contacts to join said main solenoid first main post and said main solenoid second main post when said main solenoid pull coil is activated, whereby upon said main solenoid receiving at said main solenoid activate post said control signal generated by said signal receiving means, said fluid flow shut off valve is controlled shutting off pressurized fluid flow.

8. A pressurized fluid flow controlling apparatus as claimed in claim 7 wherein said grounded electrical power supply means provides electrical power to, said signal receiving means, to said main solenoid first main post and to said first solenoid that operates said fluid flow safety valve, all simultaneously.

9. A pressurized fluid flow controlling apparatus as claimed in claim 8 wherein said grounded electrical power supply means further includes a battery, a power on-off switch, a fuse and a junction block all in series, and wherein said ground return circuits are all connected to a common ground return of said grounded electrical power supply means.

10. A pressurized fluid flow controlling apparatus as claimed in claim 9 wherein said portion of said ground return circuits connected by said fluid pressure operated switch is a main solenoid ground return circuit connected to said main solenoid ground return circuit post.

11. A pressurized fluid flow controlling apparatus as claimed in claim 10 further including a first and a second light indicating means, said first light indicating means is powered from said junction block when said power on-off switch is in the on position, said second light indicating means is powered from said junction block when said control signal is generated from said signal receiving means.

12. A pressurized fluid flow controlling apparatus as claimed in claim 11 wherein said ground return circuits further includes a ground return circuit from said first and second light indicating means and a ground return circuit from said signal receiving means both of which are joined to a common ground at said junction block.

* * * * *